US006249415B1

(12) United States Patent
Daoud et al.

(10) Patent No.: US 6,249,415 B1
(45) Date of Patent: Jun. 19, 2001

(54) SURGE PROTECTOR AND METHOD FOR PREVENTING DAMAGE FROM LINE SURGES

(75) Inventors: Bassel Hage Daoud, Parsippany; George Andrew Debalko, Long Valley; Peter F. Eckhardt, Gladstone; Antonio Albino Figueiredo, Long Valley; Adam Stuart Kane; Jason A. Kay, both of Morristown, all of NJ (US); Ivan Pawlenko, Holland, PA (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/307,903

(22) Filed: May 10, 1999

(51) Int. Cl.[7] .................................................... H02H 1/00

(52) U.S. Cl. .......................... 361/117; 361/103; 361/119; 361/213

(58) Field of Search .................................... 361/103, 104, 361/119, 124, 213, 117, 120; 337/33

(56) References Cited

U.S. PATENT DOCUMENTS

| | | | |
|---|---|---|---|
| 3,936,785 | 2/1976 | Novak . | |
| 4,086,648 | 4/1978 | Hines et al. . | |
| 4,161,762 | 7/1979 | Scheithauer . | |
| 4,277,812 | 7/1981 | Jones . | |
| 4,394,704 | 7/1983 | Jones . | |
| 4,603,368 | 7/1986 | Pagliuca . | |
| 5,101,180 * | 3/1992 | Frey | 333/12 |
| 5,384,679 | 1/1995 | Smith . | |
| 5,508,873 | 4/1996 | Knapp et al. . | |
| 5,726,851 | 3/1998 | Knapp . | |
| 5,751,534 * | 5/1998 | Debalko | 361/119 |
| 5,835,326 | 11/1998 | Callaway . | |
| 6,023,403 * | 2/2000 | McGuire et al. | 361/106 |

* cited by examiner

*Primary Examiner*—Fritz Fleming
*Assistant Examiner*—Robert L. DeBeradinis
(74) *Attorney, Agent, or Firm*—Dickstein Shapiro Morin & Oshinsky LLP

(57) ABSTRACT

A surge protector for an electrical line is disclosed. The surge protector includes a pair of conductive pins respectively connectable to electrical lines. A first pin is soldered to a lead from a gas tube surge arrester. The lead is further fixed adjacent to the first pin and then attached to the second pin. A ground bracket having an opening is positioned between and connected with the other side of the surge arrester. As an electrical surge travels through the lines, the gas tube surge arrester begins to spark over, shunting overload conditions to the ground bracket. As the temperature begins to build, the solder flows, causing an open condition in which the surge arrester disconnects from the first pin, thereby eliminating the destructive effects of a prolonged electrical surge on the lines.

36 Claims, 3 Drawing Sheets

SURGE PROTECTOR AND METHOD FOR PREVENTING DAMAGE FROM LINE SURGES

FIELD OF THE INVENTION

The present invention relates to surge protection in communications systems. More particularly, the present invention relates to a surge protector and a method for protecting against electrical surges in coaxial and other cables.

BACKGROUND OF THE INVENTION

Surge protectors are in use to protect electronic components from the deleterious effects of electrical surges. Generally, surge protectors function to shunt abnormal surges of electricity away from electronic components. There are three major causes of electrical surges: lightning pulses, ground surges, and power crosses. Lightning pulses are a relatively brief surge of electricity stemming from a strike of lightning on or near an electrical conduit, such as a power line or a communications line. Ground surges are caused when excess voltage, which follows the path of least resistance, does not entirely travel to ground, but instead strays off to another line which is itself connected to ground. Ground surges may be caused by a shorted circuit, a faulty connection to ground, the intensity of the abnormal voltage level, or the duration of an abnormal voltage level.

A power cross is potentially the most devastating type of electrical surge. A power cross comes when a pole carrying power lines is toppled, such as by high wind, a tree falling against it, or a car running into it, and falls into another line, for example, a telecommunications cable or line. Upon the pole falling, the various lines may become dislodged and crossed. Crossed lines may remain so for a lengthy time, thus subjecting a line or cable and any electrical components in connection with it to abnormal voltage conditions for a lengthy period of time. Depending upon the intensity of the power cross, as well as its duration, the line or cable may be melted. If the line or cable is running in from an industrial site, such as, for example, a phone company, the amount of line or cable melted may be miles long. The replacement cost, as well as the cost of running new line or cable, is high.

Devices have been utilized on so called "twisted pair" telephone lines to protect against electrical surges since the 1920 s. One such device, described in U.S. Pat. No. 4,161,762 (Scheithauer), acts as a fuse. Specifically, the device operates if an excess current flows through the line. Devices such as the one described in Scheithauer are impractical for coaxial communications lines. In particular, placing a fuse in a coaxial communications line changes the characteristics of the coaxial cable by adding impedance to the center conductor. Changing the characteristics alters the signals being transmitted.

Surge protectors for cables have been described in U.S. Pat. No. 5,835,326 (Callaway), U.S. Pat. No. 5,751,534 (DeBalko), U.S. Pat. No. 5,726,851 (Knapp), and U.S. Pat. No. 5,508,873 (Knapp et al.).

SUMMARY OF THE INVENTION

The present invention provides a method and apparatus for protecting electronic components and signal carrying cables from damage due to electrical line surges. The apparatus has first and second conductors respectively connectable to electrical signal paths, and a first line protection device electrically connected between the first and second conductors. The first line protection device includes a third conductor interconnecting the first and second conductors and being electrically connected to at least one of the first and second conductors through a meltable conductive fixing material, e.g., a solder. The conductive fixing material disrupts electrical connection between the third conductor and at least one of the first and second conductors when predetermined overload electrical signals are present. In one aspect of the invention, the cables are coaxial cables.

In a preferred embodiment of the invention, the third conductor is a lead which is soldered to the first conductor at a first point, the lead being further connected to the second conductor, with the solder melting under predetermined electrical overload conditions. The invention may also employ a second line protection device formed by connecting the lead to one electrical side of gas breakdown device, the other electrical side of the gas breakdown device being groundable.

These and other features and advantages of the invention will become more apparent from the following detailed description of preferred embodiments of the invention.

DETAILED DESCRIPTION OF PREFERRED EMBODIMENTS

Figure 5:
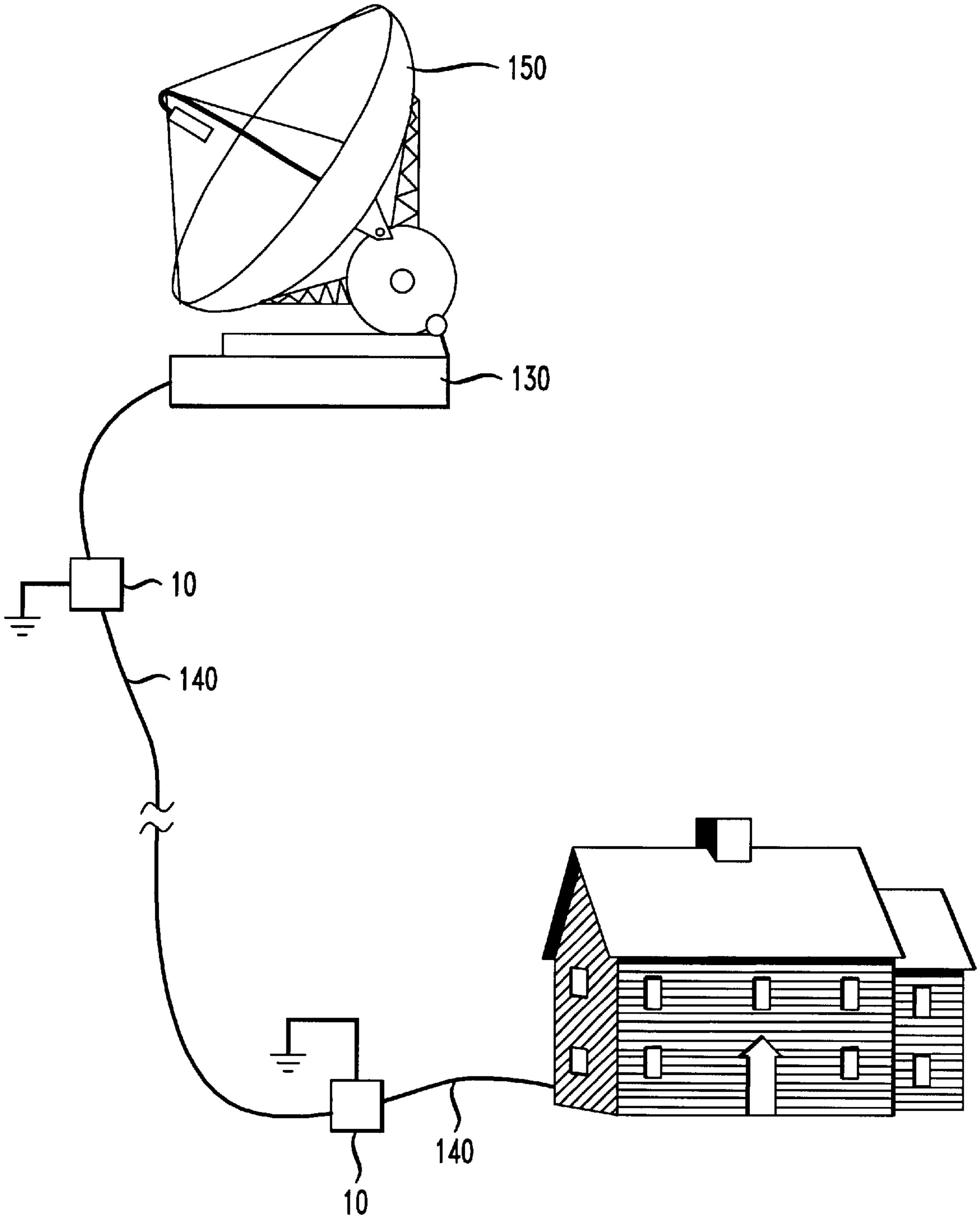
FIG. 5 is a schematic view of the line protector of FIG. 1 within an electrical system.

Referring now to the drawings, where like numerals designate like elements, there is shown schematically in FIG. 5 a line protector 10 in use in a typical communications line 140, for example, a satellite coaxial cable line. Specifically, the line protector 10 may be used to protect electronic equipment 130 in the field, such as the electronics associated with a satellite dish 150. Further, the line protector may be used to protect electronic equipment (not shown) located, for example, at a terminating location such as in a residence. Although the line protector 10 is shown on the communications line 140 between the satellite dish 150 and the residence, it is to be understood that the line protector 10 of the invention may be used on power lines, or on other signal carrying lines, such as cable television lines and computer, voice and/or data-dedicated lines like ISDN, T-1, T-3, and digital subscriber lines (DSL).

Figure 1:
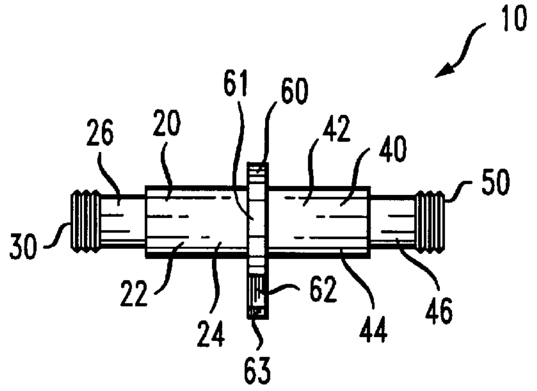
FIG. 1 is a side view of a line protector constructed in accordance with a preferred embodiment of the present invention.

With reference to FIG. 1, the line protector 10 includes a groundable bracket 60 positioned between a pair of coaxial cable terminals 20, 40. The terminals 20, 40 each include a respective tube portion 22, 42. The tube portions 22, 42 each have a first tube portion 24, 44 and a second tube portion 26, 46. Preferably, the first tube portions 24, 44 each have an end which connects to the ground bracket 60. The ground bracket 60 provides a good mounting structure for the tube portions 24, 44, and is also a convenient ground wire connection (to be described in detail below). The ends of the first tube portions 24, 44 may be soldered or otherwise adhered to the ground bracket 60. Alternatively, the ends of the first tube portions 24, 44 may be female ends having threads and the ground bracket 60 may include complementary threads on a protrusion. In this way the first tube portions 24, 44 of respectively the terminals 20, 40 may be threaded onto the ground bracket 60. Alternatively, the ends of the first tube portions 24, 44 may have external threads which thread into internal threads in an opening 68 of the bracket 60.

The first tube portions 24, 44 are of a greater diameter than the second tube portions 26, 46 to accommodate pins 80, 84, FIG. 3 which are described in greater detail below. At an end of the second tube portions 26, 46 are threaded ends 30, 50 for connection to electronic equipment 120 (FIG. 5) and/or to a line of cable 140. The threaded ends 30, 50 are particularly suitable for connection with the terminal ends of coaxial cables. However, the invention is not limited to use with coaxial cables and any suitable end connector can be employed instead of threads 30, 50 for connection with other types of electrical lines, including power lines and communications lines.

Figure 2:
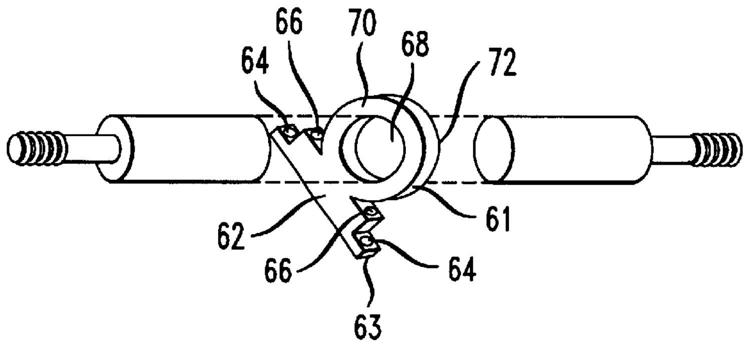
FIG. 2 is a perspective view of the coaxial cable and ground bracket of FIG. 1.

The ground bracket 60, which is formed of a conductive material, such as, for example, a metallic material, includes a ring 61 and a base 62. As shown in FIGS. 2, 3, the base includes a base bracket 63. Mounting holes 64 are located through the base bracket 63 and allow the bracket 60 to be mounted to a grounded structure. Ground holes 66 are also located in the base 62. The ground holes 66 allow for a lead 108 (to be described in more detail below) to be connected to the bracket 60. Alternatively, the holes 66 may be slots. The ring 61 has a field side 70 and an equipment side 72, with the ring opening 68 therethrough. The opening 68 allows for a surge arrester 90, shown in FIGS. 3, 4 and described in more detail below to be positioned therein.

Figure 3:
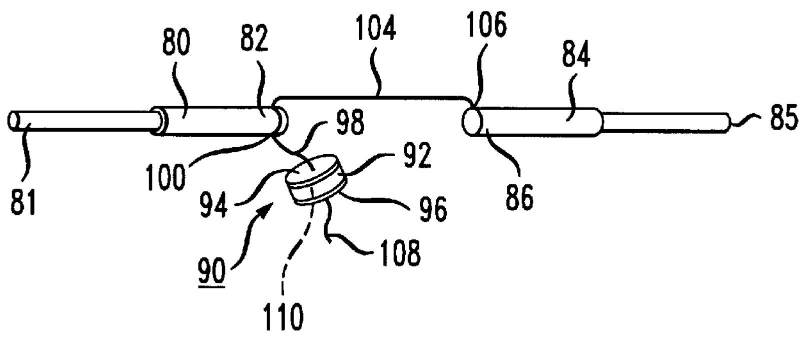
FIG. 3 is a side view of a surge arrester constructed in accordance with a preferred embodiment of the present invention.

FIG. 3 shows the surge arrester 90, which includes a non-conductive tube 92. The tube 92 is filled with a gas 110, such as, for example, argon or neon. The tube 92 is hermetically sealed and has a pair of conductive plates 94, 96 on opposite sides thereof. The plates 94, 96 may be formed of a metallic material or other like conductive material. A first lead 98 extends from the side plate 94 and a second lead 108 leads from the plate 96.

Figure 4:
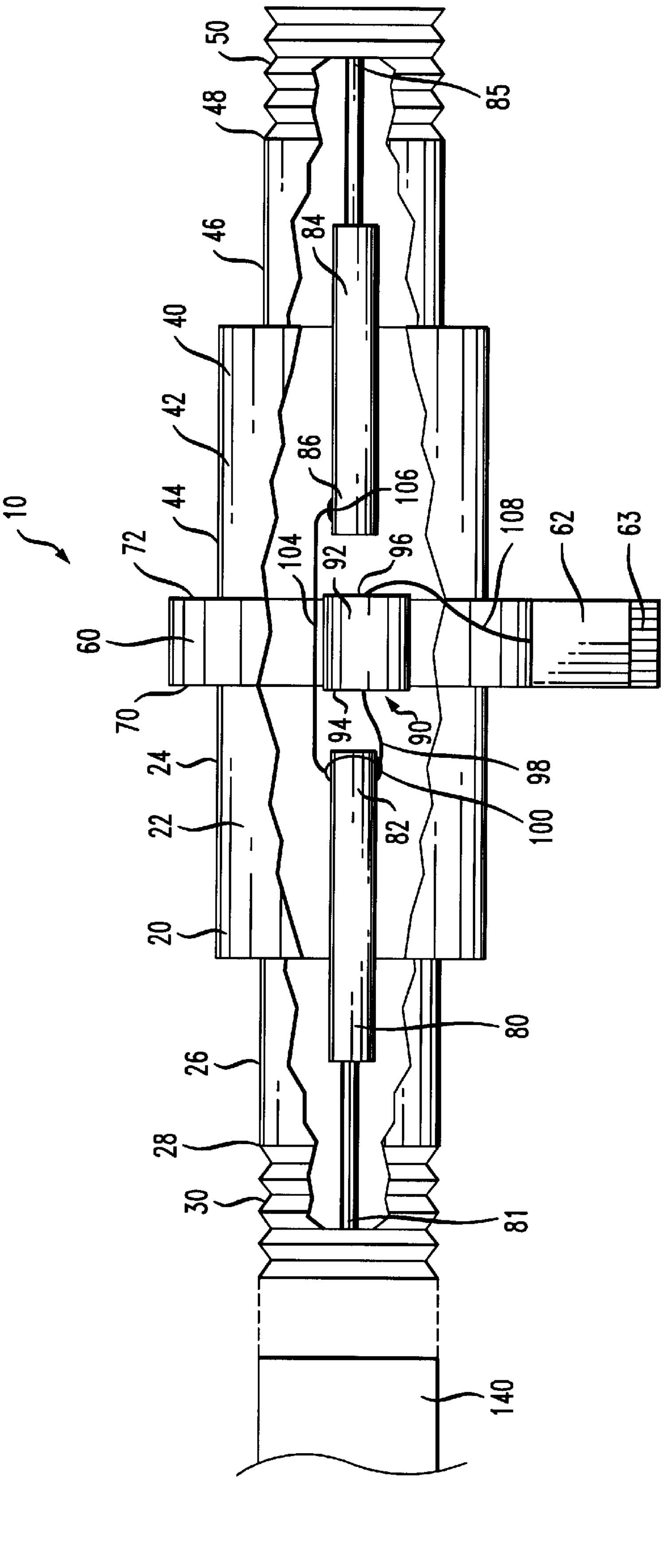
FIG. 4 is a partial cross-sectional view of the line protector of FIG. 1 including the surge arrester of FIG. 3.

An important aspect of the present invention is illustrated in FIGS. 3, 4. A conductive pin 80 including a first end 81 and a second end 82 is positionable within the terminal 20. A second conductive pin 84 includes a first end 85 and a second end 86 and is positionable within the terminal 40. Each respective end 81, 85 has a female connector for mating with a male pin (not shown) of a coaxial cable when a female collar of the coaxial cable is threaded onto the threads 30, 50.

As best shown in FIG. 4, the lead 98 extends to and is connected with the end 82 of the pin 80. The connection is by solder at solder point 100. The lead 98 may be further fixed adjacent to a portion of the circumference of the end 82. A portion 104 of the lead 98 extends from the end 82 and is connected to the end 86 of the second pin 84. The connection to the second pin 84 of the lead portion 104 may be by solder at a solder point 106. Alternatively, the lead portion 104 may be mechanically attached, such as by crimping, to the end 86 of the second pin 84.

The second lead 108 of the surge arrester 90 extends from the side plate 96 through the opening 68 in the bracket 60 to the ground hole 66 of the base 62. Alternatively, the second lead 108 may be solder to an interior surface of the bracket 60 facing the opening 68. The surge arrester 90 is positioned within the hole 68 of the bracket 60, as shown in FIG. 4.

The surge arrester 90 is designed to have a defined surge limiting characteristic. Specifically, a voltage limit may be designed into the surge arrester 90 such that once the limit is reached, spark over, or breakdown, occurs within the arrester 90. For example, a surge arrester 90 having neon as its gas may be designed with a surge limiting characteristic in the range of 70 to 80 volts. If a voltage surge higher than 70 to 80 volts is experienced, the surge arrester 90 begins to glow and conduct electricity by arcing right to the ground 108. If the voltage surge is of a short duration, such as, for example during a lightening pulse, and the voltage limit is reached, the surge arrester 90 sparks over. The surge arrester 90 acts to prevent surge damage to electric components in the event an abnormal electrical voltage surge of a relatively short duration or of a relatively low magnitude is encountered by shorting such voltage surge to ground. However, the surge arrester 90 is less effective for certain types of electrical surges of longer duration. The surge protector 90 thus serves as one overload protecting device. The solder connection of lead 98 to pin 82 serves as another overload protecting device. The interrelationship of the two overload protecting devices will now be described with reference to an exemplary installation shown in FIG. 5.

The line protector 10 is positioned at the end of an electrical line 140 near the electronic components 130, which are components for a satellite dish 150. It should be understood that FIG. 5 is merely exemplary of but one use of the overload protector 10 of the invention and with one exemplary type of line, namely, a coaxial cable. As noted, protector 10 of the invention can be used to protect any type of electrical line and/or components connected to such line.

In the presence of a higher than normal current, line protector 10 is able to carry the current through pin 80, lead 104 and pin 84 as long as the applied voltage is insufficient for the surge arrester 90 to begin to spark over. As noted above, in the event of an electrical surge from a lightening strike or other voltage spike, the surge arrester 90 sparks over in response to the elevated voltage level, sending the electrical surge to ground through the ground line 108 which is connected to the groundable bracket 60. During the spark over, the tube 92 of the surge arrester 90 will begin to glow. The spark over of the surge arrester 90 continues for the duration of the elevated voltage, which during lightening pulses is a short period of time, or until a circuit breaker in the field is flipped.

However, the surge arrester 90 is less effective in instances when an overload condition is of longer than expected duration or of greater intensity than normal, and in instances of other prolonged electrical surges, such as from power crosses and/or ground surges. Such lengthy electrical surges can, if allowed to continue, heat up the cable 140 to the point of destruction.

As noted above, the lead 98 of the arrester 90 is soldered to the pin 80 at the solder point 100. The lead 98 is fixed adjacent to a portion of the circumference of the end 82 of the pin 80, and the portion 104 of the lead 98 is extended to and connected with the end 86 of the second pin 84. Through this arrangement, during a prolonged electrical surge, when the surge arrester 90 sparks over the temperature of lead 98 rises due to the heat generated by the glowing tube 92 and the solder at solder point 100 begins to melt. Eventually, the solder will flow to such an extent that the lead 98 will disengage from the pin 80 being only placed adjacent thereto. At that moment, the lead 98 separates from the end 82 of the pin 80, the spark over of the arrester 90 ends and the electrical surge is contained or isolated on the field side of the cable 140.

The present invention diminishes the likelihood of the destruction of electronic components and large portions of coaxial cable by using the power of the electrical surge to disengage an electrical connection between cables connected by line protector 10. The present invention provides an apparatus and a method for dampening line surges and preventing damage to electronic components.

Although the invention has been described for use with a coaxial cable, for example, an N-type coaxial cable, it is to be understood that any cable, such as, for example, F-type or UHF type, can be used with the invention along with ISDN, T-1, T-3, DSL and other telecommunications cables. The invention may also be employed with power cables.

While preferred embodiments of the invention have been described and illustrated, the invention is not limited by the foregoing description as many modifications and substitutions can be made without departing from the spirit and scope of the invention. Accordingly, the scope of the present invention is not to be considered as limited by the specifics of the particular structure which have been described and illustrated, but is only limited by the scope of the appended claims.

What is claimed as new and desired to be protected by Letters Patent of the United States is:

1. An electrical overload protector comprising:

first and second conductors respectively connectable to electrical signal paths; and a first overload protection device electrically connected between said first and second conductors, said first overload protection device including a third conductor interconnecting said first and second conductors and being electrically connected to at least said first conductor through a conductive fixing material, said conductive fixing material disrupting electrical connection between said third conductor and said first conductor when predetermined electrical overload conditions are present at said first conductor.

2. The electrical overload protector of claim 1, further comprising a conductive bracket connectable to ground and a second overload protection device electrically connected between said bracket and said first conductor through said conductive fixing material, wherein said conductive bracket is configured to be physically connectable to a grounded structure.

3. The electrical overload protector of claim 2, wherein said second overload protection device has a first lead connected to said first conductor by said conductive fixing material at a first point, said first lead being further connected to said second conductor, said conductive fixing material melting when said predetermined electrical overload conditions are present.

4. The electrical overload protector of claim 3, wherein said conductive fixing material is solder.

5. The electrical overload protector of claim 3, further comprising a second lead connected to said second overload protection device, said second lead connecting said second overload protection device to said bracket.

6. The electrical overload protector of claim 5, wherein said bracket has a hole for attaching said second lead thereto.

7. The electrical overload protector of claim 5, wherein said bracket has a slot for attaching said second lead thereto.

8. The electrical overload protector of claim 5, wherein said second lead is soldered to said bracket.

9. The electrical overload protector of claim 2, wherein said first and second conductors are respectively first and second conductive pins connectable to respective electrical wires.

10. The electrical overload protector of claim 9, wherein said first and second conductors are housed within a pair of terminals which are connected to said ground bracket.

11. The electrical overload protector of claim 10, wherein said pair of terminals are respectively connectable to conductors of coaxial cables.

12. The electrical overload protector of claim 11, wherein said pair of terminals are respectively connectable to conductors of N-type coaxial cables.

13. The electrical overload protector of claim 2, wherein said second overload protection device has a first lead connected to said first conductor by said conductive fixing material at a first point, said first lead being further connected to said second conductor, said conductive fixing material melting when said predetermined electrical overload conditions are present.

14. The electrical overload protector of claim 13, wherein said second overload protection device disengages from said first pin when said predetermined electrical overload conditions are present.

15. The electrical overload protector of claim 2, wherein said second overload protection device is a surge arrester comprising a gas-filled tube and a pair of conductors on opposite ends of said tube, said third conductor being connected to one of said conductors of said pair and said bracket being connected to the other of said conductors of said pair.

16. The electrical overload protector of claim 15, wherein said pair of conductors are spaced, parallel conductive plates.

17. The electrical overload protector of claim 2, wherein said predetermined electrical overload conditions include at least one from the group consisting of ground surges, lightening pulses, and power crosses.

18. The electrical overload protector of claim 1, wherein said third conductor is connected to said second conductor through a conductive fixing material.

19. An electrical overload protector comprising:

a conductive bracket connectable between two electrical cables, said conductive bracket being configured to be physically connectable to a grounded structure;

first and second conductive pins, each said pin connectable to a conductor of a respective cable; and a protective device comprising a gas-filled tube, a pair of conductors located at opposite ends of said tube, and first and second electrical leads, said first lead connecting one of said pair of conductors to said first pin through a meltable conductive material and being further connected to said second pin, and said second lead connecting the other one of said pair of conductors to said bracket.

20. The overload protector of claim 19, wherein said conductive bracket is connected to a pair of terminal portions connected to respective electrical cables.

21. The overload protector of claim 20, wherein energy of an overload condition heats up said conductive material causing it to melt and disengage said protective device from said first pin.

22. The overload protector of claim 21, wherein said conductive material is solder.

23. The overload protector of claim 20, wherein said cables are coaxial cables.

24. The overload protector of claim 23, wherein said cables are N-type coaxial cables.

25. The overload protector of claim 19, wherein said conductors are spaced, parallel plates.

26. The overload protector of claim 19, wherein said gas-filled tube is a surge arrester.

27. The overload protector of claim 19, wherein said first lead is connected to said second pin through a meltable conductive material.

28. A system for protecting against electrical overload conditions, said system comprising:

a first electrical line; and a line protector connected to said first electrical line, said line protector comprising:

a conductive bracket connectable to ground and configured to be connectable to a grounded structure;

first and second conductive pins, said first conductive pin being connected to said electrical line, said second conductive pin being connectable to a second electrical line; and a protective device having a first and second lead, said first lead being soldered to said first pin at a solder point, said first lead being further connected to said second pin, said solder at said solder point melting under predetermined electrical overload conditions to disconnect said first lead from said first pin, said second lead being connected to said bracket.

29. The system of claim 28, wherein said conductive bracket is connected to a pair of terminal portions connectable to respective electrical cables.

30. The system of claim 28, wherein said bracket has a hole for attaching said second lead thereto.

31. The system of claim 28, wherein said protective device comprises a gas-filled tube and a pair of conductors, said first lead being connected to one conductor of said pair and said second lead being connected to the other conductor of said pair.

32. The system of claim 31, wherein said pair of conductors are spaced, parallel conductive plates.

33. The system of claim 28, wherein said first electrical line is a coaxial cable.

34. The system of claim 33, wherein said cable is an N-type coaxial cable.

35. A method of protecting an electrical line, comprising:

sensing first predetermined overload conditions on said line and in response thereto shunting said first predetermined overload conditions to ground, wherein said shunting is interrupted by the melting of conductive adhesive link forming parts of an electrical path performing said shunting operation; and interrupting said shunting condition in response to the presence of second predetermined overload conditions on said line and in response thereto.

36. A method as in claim 35, wherein said first predetermined overload conditions are shunted to ground through a surge arrester.

* * * * *